United States Patent [19]

Catanese et al.

[11] Patent Number: 4,944,856
[45] Date of Patent: Jul. 31, 1990

[54] ELECTROLYTIC ETCHING APPARATUS AND METHOD FOR MARKING METAL TUBES WITH SEQUENTIAL IDENTIFICATION NUMBERS

[75] Inventors: John A. Catanese, Seward; Susan R. Saunders, Cook Township, Westmoreland County, both of Pa.

[73] Assignee: Westinghouse Electric Corp., Pittsburgh, Pa.

[21] Appl. No.: 340,199

[22] Filed: Apr. 19, 1989

[51] Int. Cl.$^5$ .............................. C25F 3/02; C25F 7/00
[52] U.S. Cl. .............................. 204/129.2; 204/129.6; 204/224 M; 204/225
[58] Field of Search .............. 204/224 M, 225, 224 R, 204/129.6, 129.2

[56] References Cited

U.S. PATENT DOCUMENTS

| | | | |
|---|---|---|---|
| 2,491,910 | 12/1949 | Schinske | 204/224 R X |
| 2,967,813 | 1/1961 | Lindsay | 204/224 |
| 2,971,810 | 2/1961 | Ressler | 204/129.6 X |
| 3,007,396 | 11/1961 | Govan | 101/42 |
| 3,150,068 | 9/1964 | Montgomery | 204/224 M |
| 3,290,236 | 12/1966 | Mayer | 204/224 |
| 3,410,782 | 11/1968 | Godbehere | 204/224 |
| 3,637,468 | 1/1972 | Icxi et al. | 204/224 X |
| 3,679,558 | 7/1972 | Godbehere | 204/224 R X |
| 4,045,312 | 8/1977 | Satoshi | 204/129.6 X |
| 4,132,618 | 1/1979 | Boulanger et al. | 204/218 |
| 4,287,043 | 9/1981 | Eckert et al. | 204/228 |
| 4,497,848 | 2/1985 | Baran | 427/106 |

FOREIGN PATENT DOCUMENTS 1376541 12/1974 United Kingdom .

Primary Examiner—Donald R. Valentine
Attorney, Agent, or Firm—J. C. Spadacene

[57] ABSTRACT

An electrolytic etching apparatus employs a continuous stencil imprinted with a sequence of identification numbers and includes spaced spools and upper and lower electrodes defining an etching station located between the spools. The stencil extends between the spools and is moved by rotatably indexing the spools to position successive ones of the identification numbers over the lower electrode for etching on a successive one of the metal tubes. A wicking pad is draped over the lower electrode below the stencil and has one end extending into a reservoir of electrolyte also located below the stencil. The wicking pad draws up electrolyte by capillary action to provide a steady flow of the electrolyte to the portion of the wicking pad located directly below a portion of the stencil located at the etching station. The upper electrode is mounted for movement toward and away from the lower electrode and the wicking pad and stencil portions. One tube to be marked is placed between the upper electrode and the stencil portion. The upper electrode is moved downwardly to press the tube against the stencil portion and thereby against the wicking pad portion and lower electrode. A voltage is then applied to the upper and lower electrodes for causing the electrolytic etching action to occur and mark one identification number on the surface of the tube.

23 Claims, 5 Drawing Sheets

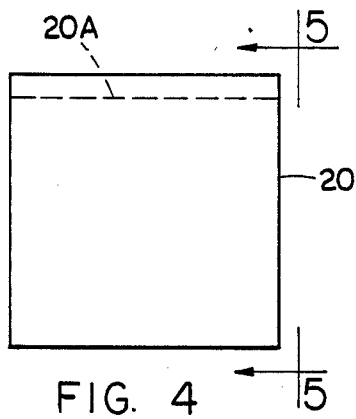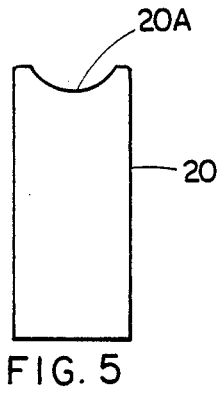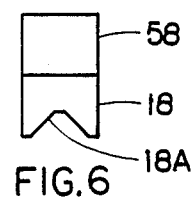
FIG. 4  FIG. 5  FIG. 6
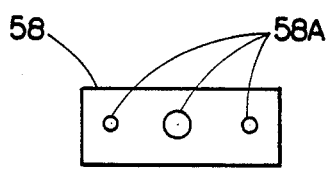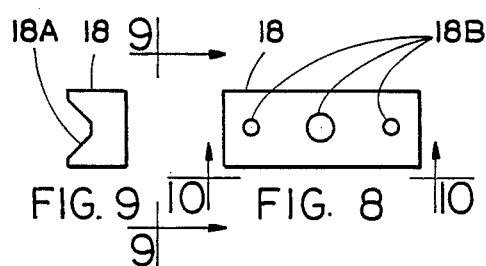
FIG. 7  FIG. 9  FIG. 8
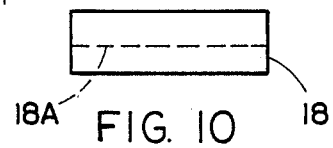
FIG. 10
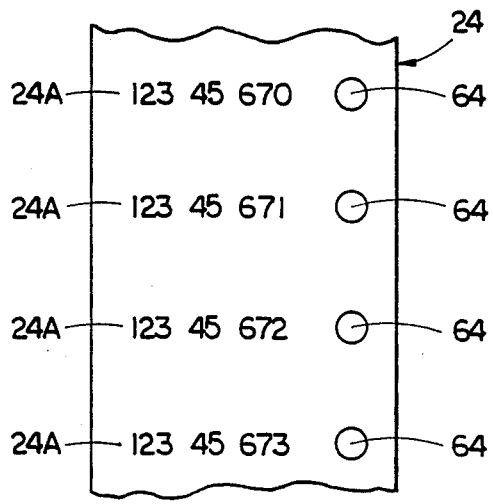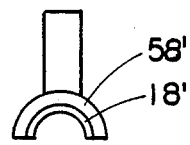
FIG. 11  FIG. 12

ELECTROLYTIC ETCHING APPARATUS AND METHOD FOR MARKING METAL TUBES WITH SEQUENTIAL IDENTIFICATION NUMBERS

BACKGROUND OF THE INVENTION

1. Field of the Invention

The present invention relates generally to electrolytic marking apparatus and, more particularly, is concerned with an electrolytic etching apparatus and method for marking metal tubes with sequential identification numbers.

2. Description of the Prior Art

In the manufacture of nuclear fuel rods, it is desirable at the start of the manufacturing process to temporarily mark the fuel rod cladding tubes for purposes of traceability through the process. A marking method capable of providing an identification marking on the tube without significantly disturbing the surface or metallurgical characteristics of the tube is desired.

One such method is electrolytic etching or marking which is well-known in the prior art. Representative of the prior art are the electrolytic marking apparatuses disclosed in Lindsay U.S. Pat. No. (2,967,813), Mayer U.S. Pat. No. (3,290,236) and Boulanger et al U.S. Pat. No. (4,132,618). In the apparatus of the Mayer patent, a metal part to be marked is supported on a base electrode. An absorbent pad attached to a head of an upper electrode located above the part is saturated with an electrolyte from an overhead reservoir. A stencil bearing the identification indicia is mounted in a holder attached to a vertically reciprocable member which also carries the upper electrode and overhead reservoir. The holder positions the stencil below the pad and above the part.

To electrolytically mark the part using the Mayer apparatus, the reciprocable member is lowered, causing the movable electrode head and pad thereon to press the stencil against the part. At this time, electrical energy is applied to the electrodes causing an electrolytic etching action to occur through the cooperation of the electrolytic solution and electrical energy operating through the stencil.

Although the Mayer apparatus might be suitable for marking some metal parts, it has drawbacks when applied to marking large numbers of tubes, such as nuclear fuel rod cladding tubes. Because the stencil used in the Mayer apparatus only contains one identification number and is held stationary by the apparatus holder, the stencil has to be replaced each time to apply a different identification number. As a result, use of this apparatus would be too slow and thus not feasible in conjunction with production of a large number of tubes with unique identification numbers. Also, the location of the electrolyte-saturated pad above the part would make it difficult to control the amount of electrolyte applied to the stencil and part with the likelihood being that the amount would be uneven and produce a non-uniform identification number.

Consequently, a need exist for a different approach to electrolytic marking of tubes which avoids the above-mentioned drawbacks.

SUMMARY OF THE INVENTION

The present invention provides an electrolytic etching apparatus and method designed to satisfy the aforementioned needs. The electrolytic etching apparatus and method of the present invention are capable of marking conductive metal objects, such as fuel rod metallic cladding tubes, with sequential identification numbers in a high quality, repeatable manner.

Accordingly, the present invention is directed to an electrolytic etching apparatus for a marking metal tube with identification indicia, such as a number. The apparatus comprises: (a) a pair of spaced rotatable spools; (b) a pair of upper and lower electrodes defining an etching station located between the spools, one of the electrodes being movable toward and away from the other; (c) a continuous stencil connected to and extending between the spools such that rotation of the spools moves a portion of the stencil imprinted with identification indicia into the etching station between the upper and lower electrodes; (d) a reservoir of electrolyte disposed below the stencil; and (e) a wicking pad having a main portion disposed over the lower electrode and below the portion of the stencil and an end portion extending downwardly into the reservoir of electrolyte, the wicking pad thereby capable of drawing up electrolyte from the reservoir by capillary action to provide a steady flow of the electrolyte to the wicking pad main portion for facilitating etching of the identification indicia on a metal tube, being placed below the upper electrode and above the lower electrode, wicking pad and stencil, upon relative movement of the electrodes toward one another and application of a predetermined voltage to the electrodes.

More particularly, the upper and lower electrodes have respective lower and upper facing surfaces shaped to complement opposite exterior surface portions of the tube to be marked. Also, the apparatus includes means for mounting the upper electrode in alignment above the lower electrode and for moving the upper electrode toward and away from the lower electrode. Further, the apparatus includes means for rotating at least one of the spools for moving and indexing the stencil to dispose the portion thereof at the etching station between the electrodes for facilitating etching of the metal tube placed below the upper electrode and above the lower electrodes, wicking pad and stencil. Still further, the apparatus includes means for facilitating alignment of the portion of the stencil imprinted with the identification indicia at the etching station between the upper and lower electrodes.

The present invention is also directed to an electrolytic etching method for a marking metal tube with identification indicia. The method comprises the steps of: (a) rotatably moving at least one of a pair of spaced rotatable spools for moving a portion of a stencil extending between and interconnecting the spools and having identification indicia imprinted thereon into an etching station between a pair of aligned upper and lower electrodes; (b) wetting a main portion of a wicking pad with a steady flow of electrolyte through capillary action in the wicking pad to the main portion disposed below the stencil portion and over the lower electrode from a lower end portion of the pad placed into a reservoir of electrolyte located below the main portion of the pad; (c) placing a metal tube below the upper electrode and above the lower electrode, wicking pad main portion and stencil portion; and (d) moving the upper electrode toward the lower electrode with the metal tube placed under the upper electrode and above the stencil portion to press the metal tube downward into contact with the stencil portion and the stencil portion in turn into contact with the wicking pad main portion wetted with electrolyte and facilitate etching of the identification indicia on the tube upon application of a predetermined voltage to the electrodes.

Further, the method comprises the step of aligning the stencil portion imprinted with identification indicia at the etching station between the upper and lower electrodes. Such aligning is carried out by matching a hole through the stencil portion adjacent to the identification indicia imprinted thereon with a hole through a base mounting the spools. Such aligning further includes detecting when the stencil hole has been moved into alignment with the base hole.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 4 is an end elevational view of a lower electrode removed from the electrolytic etching apparatus of FIGS. 1-3.

FIG. 5 is a side elevational view of the lower electrode as seen along line 5—5 of FIG. 4.

FIG. 6 is a side elevational view of an upper electrode and insulator member removed from the electrolytic etching apparatus of FIGS. 1-3.

FIG. 7 is a top plan view of the upper electrode and insulator removed from the apparatus of FIGS. 1-3.

FIG. 8 is a top plan view of the upper electrode removed from the apparatus of FIGS. 1-3.

FIG. 9 is a side elevational view of the upper electrode as seen along line 9—9 of FIG. 8.

FIG. 10 is an end elevational view of the upper electrode as seen along line 10—10 of FIG. 8.

FIG. 11 is a fragmentary top plan view of a continuous stencil employed in the electrolytic etching apparatus of FIGS. 1-3.

FIG. 12 is a side elevational view of an alternative embodiment of the upper electrode and insulator member.

DETAILED DESCRIPTION OF THE INVENTION

Figure 1:
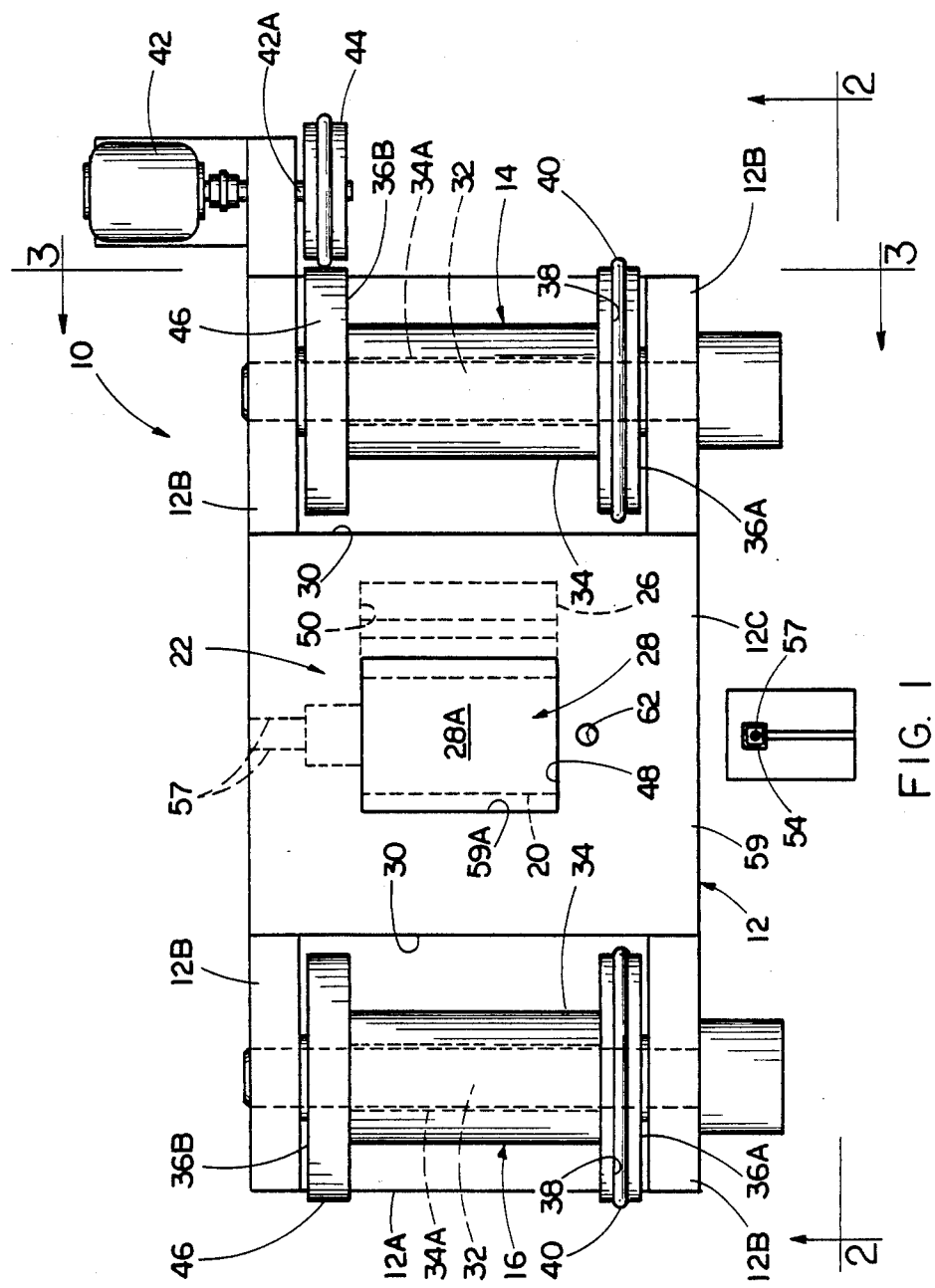
FIG. 1 is a top plan view of an electrolytic etching apparatus in accordance with the present invention.

In the following description, like references characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Referring now to the drawings, and particularly to FIGS. 1-3 and 13, there is illustrated an electrolytic etching apparatus, generally designated by the numeral 10 and constructed in accordance with the principles of the present invention. The electrolytic etching apparatus 10 is operable for marking metal tubes T one at a time with identification indicia, such as identification numbers in a chronological sequence. In its basic components, the apparatus 10 includes a stationary base 12, a pair of spools 14, 16 spaced apart and rotatably mounted on the base 12, a pair of upper and lower electrodes 18, 20 defining an etching station, generally designated 22, located between the spools 14, 16, a continuous strip of stencil 24 wound at its opposite ends about the spools 14, 16 and extending therebetween and between and past the upper and lower electrodes 18, 20, a reservoir 26 of electrolyte 26A supported on the base 12, and a wicking pad 28 extending over and in contact with the lower electrode 20 and downwardly into the reservoir 26 of the electrolyte 26A.

More particularly, the base 12 of the apparatus 10 has a bottom portion 12A with opposite upstanding side portions 12B and interconnected at the middle of the base by a block portion 12C. The base 12 is composed of a suitable non-conductive material, for example a synthetic material such as nylon. The bottom portion 12A of the base 12 extending from on opposite ends of the middle block portion 12C together with the opposite side portions 12B define opposite end cavities 30 within which the spools 14, 16 are disposed.

The spools 14, 16 of the apparatus 10 are rotatable mounted on axle bolts 32 which extend transversely across the base 12, being mounted through and to the opposite side portions 12B of the base. The spools 14, 16 and axle bolts 32 are composed of a suitable non-conductive material, for example a plastic such as polyurethane. The spools 14, 16 of the apparatus 10 have substantially identical constructions. Each spool 14, 16 has an elongated cylindrical body 34 with a longitudinal bore 34A for receiving one axle bolt 32 and a pair of annular opposite end flanges 36 attached to the opposite ends of the cylindrical body 34 which are larger in diameter than the body 34. The strip of stencil 24 is wound around the cylindrical bodies 34 of the spools 14, 16.

One annular end flange 36A of each spool 14, 16 has a groove 38 defined around its periphery in which is seated an O-ring 40. The O-rings 40, composed for example of rubber, can be frictionally engaged by the fingers of an operator to easily manually rotate the spools 14, 16. Alternatively, powered driving means can be used. Such powered driving means includes a motor 42 and a rotatable friction drive gear 44 connected to an output drive shaft 42A of the motor 42. The gear 44 is frictionally engaged with a smooth cylindrical surface 46 on the periphery of the other end flange 36B of the one spool 14 for transmitting rotary motion of the motor 42 to the one spool 14. The other spool 16 is free-wheeling.

In addition to FIGS. 1-3 and 13, the lower electrode 20 is also seen in FIGS. 4 and 5 and the upper electrode 18 is also seen in FIGS. 6-10. The upper and lower electrodes 18, 20 have the form of rectangular-shaped blocks with respective lower and upper arcuate or curved facing surfaces 18A, 20A and composed of a suitable conductive metal, such as stainless steel. The block of the upper electrode 18 is much shorter in height than the block of the lower electrode 20. The arcuate shape of the respective facing surfaces 18A, 20A complements the opposite exterior surface portions of the tubes T to be marked.

The middle block portion 12C of the base 12 has a recess 48 within which the lower electrode 20 is supported on the base 12 and between the spools 14, 16. The eleotrolytic reservoir 26 is contained in another recess 50 formed in the base 12. The reservoir 26 is located below the stencil 24 and the upper facing surface 20A of the lower electrode 20. The electrolyte 26A can be any suitable solution which will serve as the conducting medium for the etching current and provide the necessary salts to etch the metal tube and deposit an oxide for a contrasting mark.

Figure 2:
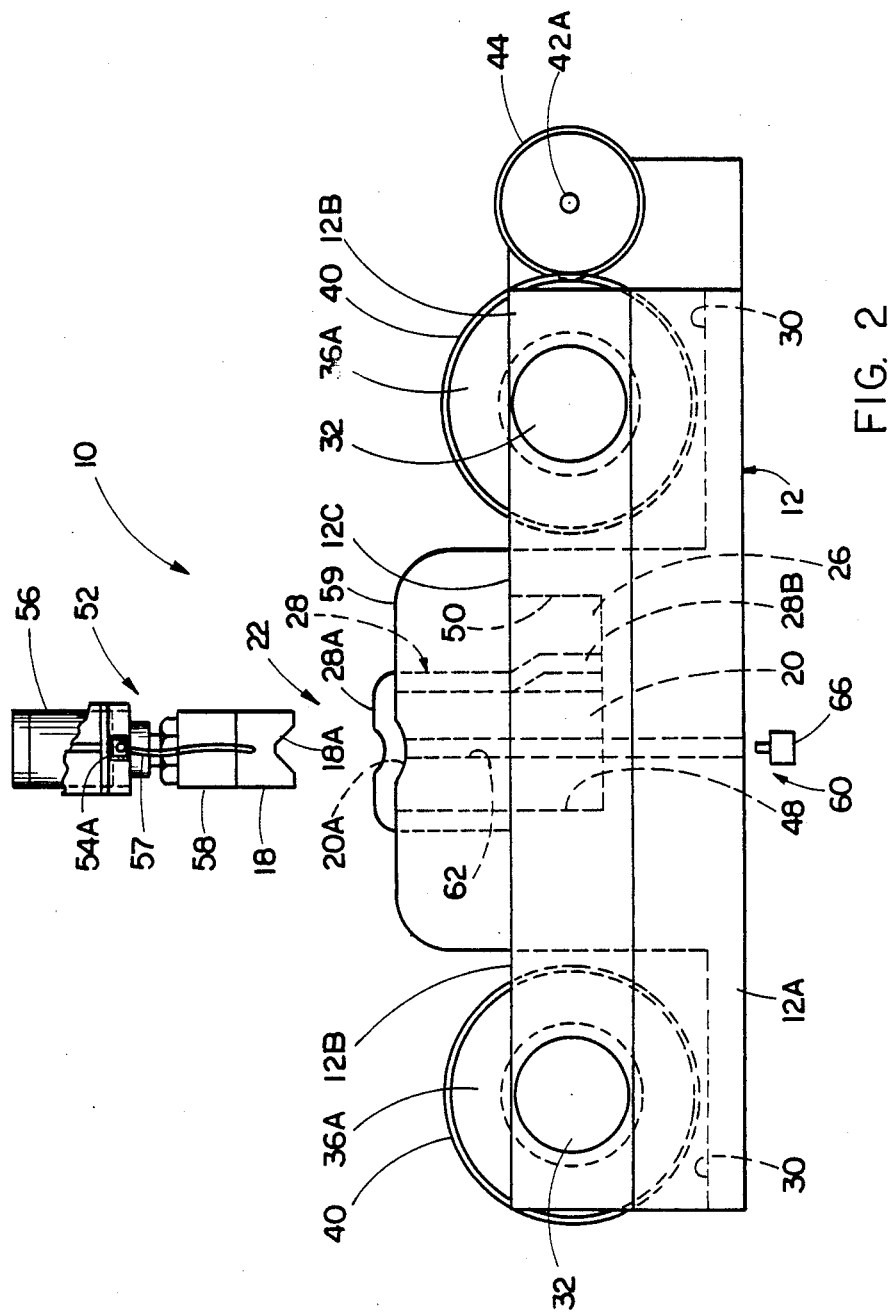
FIG. 2 is a side elevational view of the apparatus as seen along line 2—2 of FIG. 1.
Figure 3:
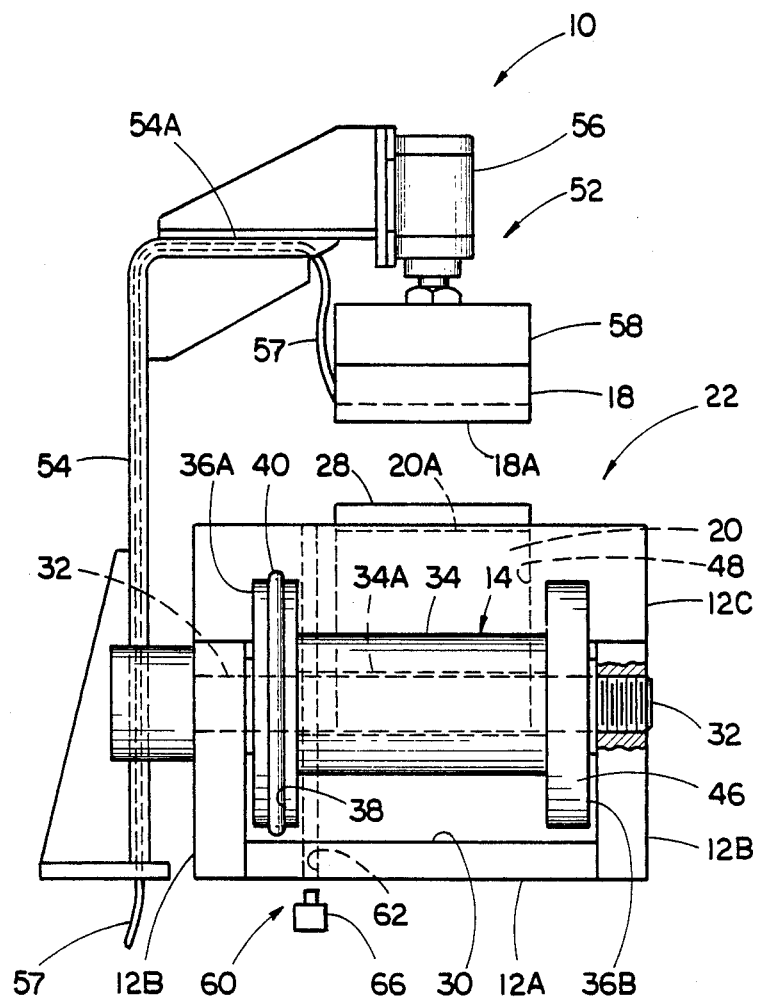
FIG. 3 is an end elevational view of the apparatus as seen along line 3—3 of FIG. 1.
Figure 13:
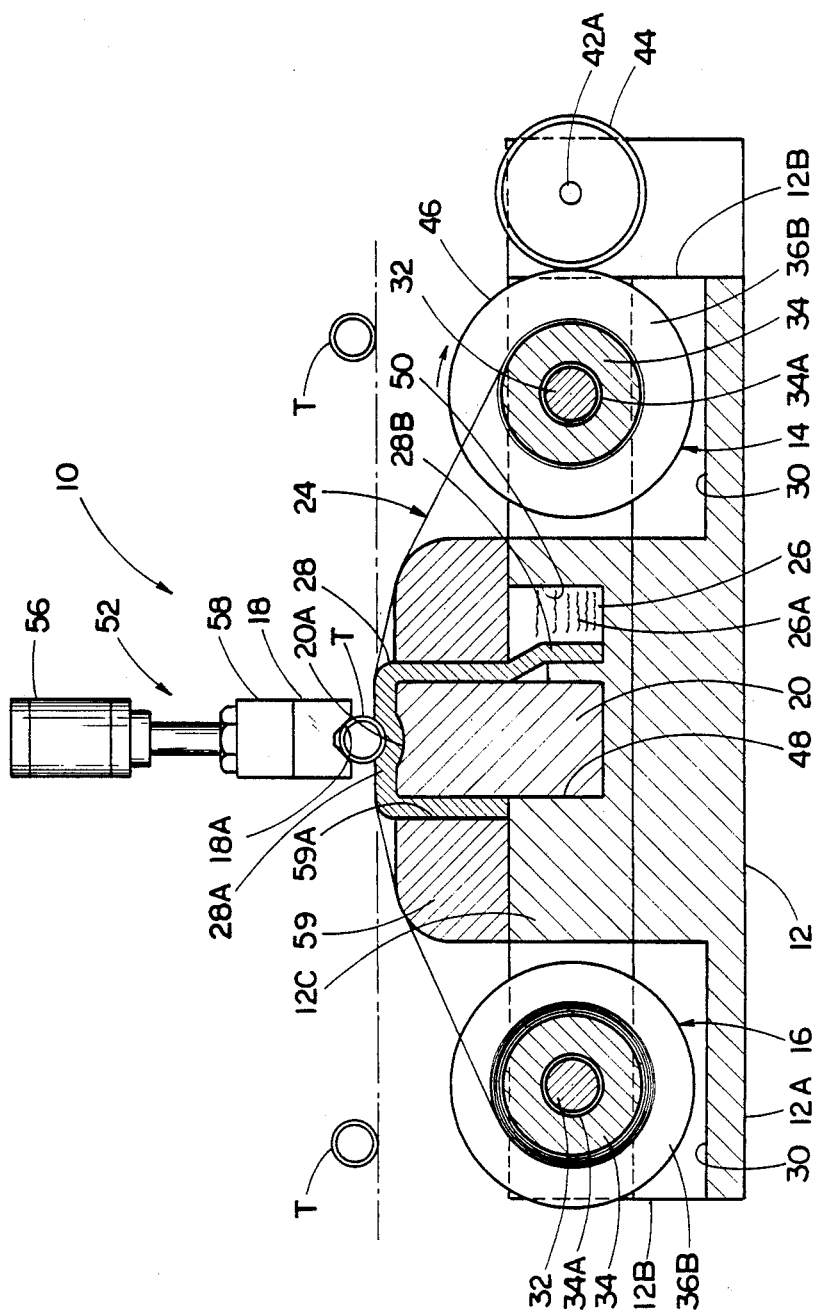
FIG. 13 is a longitudinal sectional view of the electrolytic etching apparatus of FIGS. 1-3, illustrating the apparatus carrying out an electrolytic etching action for marking an identification indicia on a metal tube.

The apparatus 10 also includes means 52 for mounting the upper electrode 18 above and in alignment with the lower electrode 20 and for moving the upper electrode 18 toward and away from the lower electrode 20. More particularly, the upper electrode mounting and moving means 52 includes an elongated bracket 54 mounted in upstanding fashion adjacent the base 12 and an extendable and retractable actuator 56, such as an air cylinder, supported at the upper horizontal portion 54A of the bracket 54. The upper electrode 18 is mounted by an insulator member 58 to the upper portion 54A of the bracket 54 via respective aligned holes 18B, 58A provided in both the upper electrode and insulator member. The actuator 56 is operable to move the upper electrode 18 from an extended position (as seen in FIG. 13) to a retracted position position (as seen in FIG. 2) respectively toward and away from the lower electrode 20 stationarily position on the base 12. The operation of the actuator 56 can be precisely controlled to press the upper electrode 18 downwardly against each tube T disposed at the etching station 22 with a predetermined level of pressure which gives the desired etching results.

The strip of stencil 24 which extends between and is wound at its opposite ends about the spools 14, 16 of the apparatus 10 is shown by itself in a fragmentary portion in FIG. 11. The stencil 24 is a thin sheet of material with a coating of high dielectric value. The stencil 24 is imprinted preferably with a chronological sequence of spaced identification indicia, an example of which is depicted in FIG. 11. Preferably, the stencil 24 is prepared using a computer program to imprint the serialized numbers. The character created is a seven segment digit that is legible to an optical character reader. The stencil 24 can be printed with a dot matrix printer. The imprint from the dot matrix printing head removes an insulating material from the film of the stencil 24. Rotation and indexing of the spools 14, 16 advances successively each of the portions 24A of the stencil with one identification indicia impressed thereon between the respective lower and upper facing surfaces 18A, 20A of the upper and lower electrodes 18, 20.

The wicking pad 28 of the apparatus 10 is an absorbent fibrous material capable of holding the electrolyte 26A. The wicking pad 28 rests on the upper facing surface 20A of the lower electrode 20. More particularly, the pad 28 has a main portion 28A which extends in a draped fashion over and in contact with the lower electrode upper facing surface 20A, as best shown in FIG. 13. The wicking pad main portion 28A is disposed directly below an identification indicia-bearing portion 24A of the stencil 24 disposed at the etching station 22. The wicking pad 28 also has one end portion 28B extending downwardly from the main portion 28A and into the reservoir 26 and contacting the electrolyte 26A. Due to the inherent nature of the material composing it, the wicking pad 28 is thereby capable of drawing up electrolyte 26A from the reservoir 26 by capillary action in a self-regulating manner to provide a steady flow of the electrolyte 26A to the wicking pad main portion 28A. A cover 59 having a central hole 59A for accommodating the wicking pad 28 and the upper portion of the lower electrode 20 is fitted over the pad and electrode upper portion to hold the pad in place over the lower electrode. The cover 59 is composed of any suitable non-conductive material, for example a synthetic material such as nylon.

Since the stencil portion 24A overlies the wicking pad main portion 28A and the lower electrode 20, pressing tube T downwardly by the upper electrode 18 completes physical and electrical contact between the stencil portion and the wicking pad 28 with the electrolyte 26A thereon and lower electrode 20 therebelow. Then, upon application of a predetermined steady voltage for a predetermined period of time to the upper and lower electrodes 18, 20 via electrical conductors 57, an electrolytic etching action is carried out which marks the tube with the one identification indicia on the one stencil portion 24A. The color and degree of thickness of the mark etched on the tube can be regulated by controlling the voltage and time. The etched mark does not cause any detectable dimensional or structural changes in the tube nor does it cause corrosion.

The apparatus 10 further includes means, generally designated 60, for facilitating and ensuring precise alignment of each portion 24A of the stencil 24 imprinted with one of the identification indicia at the etching station 22 between the upper and lower electrodes 18, 20. More particularly, the alignment means 60 includes a hole 62 formed through the middle block portion 12C of the base 12 adjacent to and aligned with the electrodes 18, 20. Also, the alignment means 60 includes a plurality of holes 64 formed in the respective portions 24A of the stencil 24 adjacent to the respective identification indicia imprinted thereon. Each of the stencil holes 64 is alignable with the base hole 62 by moving the particular stencil portion 24A into the etching station 22 between the electrodes 18, 20. Finally, the alignment means 60 includes means 66, such as a photo-optic detector device, for detecting when one stencil hole 64 has been moved into alignment with the base hole 62. The detector device 66 is connected to the motor 42 in a manner not shown for controlling stopping of the motor to precisely position the stencil portion 24A at the etching station 22.

Regardless of whether the O-ring 40 or the motor 42 is used to rotate the spool 14, rotation of the spool 14 is used to move and index the stencil 24 in order to successively position the sequenced identification indicia imprinted thereon at the etching station 22. By matching the hole 62 in the base 12 with the correct hole 64 in the stencil 24 adjacent the one of the identification numbers to be etched on the tube T, the portion 24A of the stencil 24 containing the correct number is brought into alignment with the lower and upper facing surfaces 18A, 20A of the upper and lower electrodes 18, 20 for facilitating etching of successive metal tubes T.

FIG. 12 merely illustrates one alternative configuration for the upper electrode 18' and its insulator member 58'.

Referring to FIG. 13, the method of operation of the apparatus 10 can be observed in performing electrolytic etching of a metal tube T to mark the tube with identification indicia, such as one of the numbers in the chronological sequence thereof shown in FIG. 11. The spools 14, 16 are rotatably moved manually or automatically for moving the one portion 24A of the stencil 24 having the desired one identification indicia imprinted thereon into the etching station 22 between the aligned upper and lower electrodes 18, 20. Aligning of the stencil portion 24A at the etching station 22 between the upper and lower electrodes 18, 20 is ensured by matching the one hole 64 through the stencil portion 24A with the base hole 62.

Because of its above-described mounting relation, the main portion 28A of the wicking pad 28 is wetted through capillary action with a steady flow of the electrolyte 26A from the lower end portion 28B of the pad placed into the reservoir 26 of the electrolyte 26A. When a metal tube T has been placed below the upper electrode 18 and above the lower electrode 20, wicking pad main portion 28A and stencil portion 24A, by moving the upper electrode 18 toward the lower electrode 20 the desired pressure can be applied to press the metal tube T downward into contact with the stencil portion 24A and the stencil portion, in turn, in contact with the wicking pad main portion 28A wetted with electrolyte. Sufficient electrical contact now exists such that upon application of a predetermined voltage to the electrodes 18, 20, electricity flows through the electrodes, through the main portion 28A of the wicking pad 28 with the electrolyte 26A thereon, and through the stencil portion 24A to carry out electrolytic etching of the indicia on the tube. Because AC power is supplied, the metal is alternatively etched in the design contained on the stencil portion 24A and redeposited as an oxide on the tube surface.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. An electrolytic etching apparatus for marking a metal tube with identification indicia, comprising:
   (a) a pair of spaced rotatable spools;
   (b) a pair of upper and lower electrodes defining an etching station located between said spools, one of said electrodes being movable toward and away from the other;
   (c) a continuous stencil connected to and extending between said spools such that rotation of said spools moves a portion of said stencil imprinted with identification indicia into said etching station between said upper and lower electrodes;
   (d) a reservoir of electrolyte disposed below said stencil; and
   (e) a wicking pad having a main portion disposed over and in contact with said lower electrode and below said portion of said stencil and an end portion extending downwardly into said reservoir of electrolyte, said wicking pad thereby capable of drawing up electrolyte from said reservoir by capillary action to provide a steady flow of the electrolyte to said wicking pad main portion for facilitating etching of the identification indicia on a metal tube placed below said upper electrode and above said lower electrode, wicking pad and stencil upon relative movement of said electrodes toward one another and application of a predetermined voltage to said electrodes.

2. The apparatus as recited in claim 1, wherein said upper and lower electrodes have respective lower and upper facing surfaces shaped to complement opposite exterior surface portions of the tube to be marked.

3. The apparatus as recited in claim 1, further comprising:
   means for mounting said upper electrode in alignment above said lower electrode and for moving said upper electrode toward and away from said lower electrode.

4. The apparatus as recited in claim 1, further comprising
   means for rotating at least one of said spools for moving and indexing said stencil to dispose said portion thereof imprinted with identification indicia at said etching station between said electrodes for facilitating etching of the metal tube placed below said upper electrode and above said lower electrode, wicking pad and stencil.

5. The apparatus as recited in claim 1, further comprising:
   means for facilitating alignment of said portion of said stencil imprinted with identification indicia at said etching station between said upper and lower electrodes.

6. An electrolytic etching apparatus for a marking metal tube with identification indicia, comprising:
   (a) a stationary base;
   (b) a pair of spools spaced apart and rotatably mounted on said base;
   (c) a pair of upper and lower electrodes defining an etching station located between said spools, said lower electrode being supported on said base between said spools, said upper electrode being movable toward and away from said lower electrode;
   (d) a continuous stencil having a portion imprinted with identification indicia, said stencil being wound at its opposite ends about said spools and extending therebetween such that rotation of said spools moves said stencil portion into said etching station between said upper and lower electrodes;
   (e) means on said base and stencil for facilitating alignment of said stencil portion at said etching station with the identification indicia between said upper and lower electrodes;
   (f) a reservoir of electrolyte supported on said base below said stencil;
   (g) a wicking pad having a main portion disposed over and in contact with said lower electrode and below said portion of said stencil and an end portion extending downwardly into said reservoir of electrolyte, said wicking pad thereby capable of drawing up electrolyte from said reservoir by capillary action to provide a steady flow of the electrolyte to said wicking pad main portion for facilitating etching of the identification indicia on a metal tube placed below said upper electrode and above said lower electrode, wicking pad and stencil upon movement of said stencil portion into alignment between said electrodes, followed by movement of said upper electrode toward said lower electrode so as to press the tube against said stencil portion, and upon application of a predetermined voltage to said electrodes.

7. The apparatus as recited in claim 6, wherein said alignment facilitating means includes a hole through said base adjacent to and aligned with said electrodes, a hole in said stencil portion adjacent to the identification indicia imprinted thereon and alignable with said base hole by movement of said stencil portion into said etching station between said electrodes, and means for detecting when said stencil hole has been moved into alignment with said base hole.

8. The apparatus as recited in claim 6, wherein said upper and lower electrodes have respective lower and upper facing surfaces shaped to complement opposite exterior surface portions of the tube to be marked.

9. The apparatus as recited in claim 6, further comprising:
means for mounting said upper electrode in alignment above said lower electrode and for moving said upper electrode toward and away from said lower electrode.

10. The apparatus as recited in claim 9, wherein said mounting and moving means includes an extendable and retractable actuator.

11. The apparatus as recited in claim 6, further comprising:
means for rotatably moving at least one of said spools for moving and indexing said stencil to dispose said portion thereof imprinted with identification indicia at said etching station between said electrodes for facilitating etching of the metal tube placed below said upper electrode and above said lower electrode, wicking pad and stencil.

12. The apparatus as recited in claim 11, wherein said spool moving means includes a motor and a friction drive member connected to said motor and coupled with said one spool for transmitting rotary motion of said motor to said spool.

13. The apparatus as recited in claim 11, wherein said spool moving means includes an O-ring mounted to said one spool for contact to manually rotate said spool.

14. An electrolytic etching apparatus for marking metal tubes with a sequence of identification indicia, comprising:
(a) a stationary base;
(b) a pair of spools spaced apart and rotatably mounted on said base;
(c) a pair of upper and lower electrodes defining an etching station located between said spools and having respective lower and upper facing surfaces shaped to complement opposite exterior surface portions of the tubes to be marked, said lower electrode being supported on said base between said spools;
(d) means for mounting said upper electrode in alignment above said lower electrode and for moving said upper electrode toward and away from said lower electrode;
(e) a strip of stencil imprinted with a sequence of spaced identification indicia, said stencil being wound at its opposite ends about said spools and extending therebetween such that a portion of said stencil with one identification indicia in said sequence thereof is disposed between said respective lower and upper facing surfaces of said upper and lower electrodes;
(f) a reservoir of electrolyte supported on said base below said stencil and said upper facing surface of said lower electrode;
(g) a wicking pad having a main portion extending over and in contact with said upper facing surface of said lower electrode and disposed below said portion of said stencil and an end portion extending downwardly from said main portion and into said reservoir of electrolyte, said wicking pad thereby capable of drawing up electrolyte from said reservoir by capillary action in a self-regulating manner to provide a steady flow of the electrolyte to said wicking pad main portion; and
(h) means for rotating at least one of said spools for moving and indexing said stencil to successively position said identification indicia of said sequence thereof on said stencil at said etching station in alignment with said lower and upper facing surfaces of said upper and lower electrodes for facilitating etching of metal tubes successively placed therebetween and above said electrolyte-bearing wicking pad and said stencil;
(i) said upper electrode mounting and moving means being operable to move said upper electrode downwardly to press each tube disposed at said etching station with a predetermined level of pressure against said stencil portion and the one of said identification indicia imprinted thereon aligned at said etching station and overlying said wicking pad main portion and said lower electrode whereby upon application of a predetermined steady voltage for a predetermined period of time to said upper and lower electrodes an electrolytic etching action is carried out which marks the tube with said one identification indicia.

15. The apparatus as recited in claim 14, further comprising:
means for facilitating alignment of said portion of said stencil imprinted with the one of said identification indicia at said etching station between said upper and lower electrodes.

16. The apparatus as recited in claim 15, wherein said alignment facilitating means includes a hole through said base adjacent to and aligned with said electrodes, a plurality of holes in said stencil each adjacent to one of said identification indicia imprinted thereon and alignable with said base hole by movement of said portions of said stencil into said etching station between said electrodes, and means for detecting when one of said stencil holes has been moved into alignment with said base hole.

17. The apparatus as recited in claim 14, wherein said mounting and moving means includes an extendable and retractable actuator.

18. The apparatus as recited in claim 14, wherein said spool moving means includes a motor and a friction drive member connected to said motor and coupled with said one spool for transmitting rotary motion of said motor to said spool.

19. The apparatus as recited in claim 14, wherein said spool moving means includes an O-ring mounted to said one spool for contact in manually rotating said spool.

20. An electrolytic etching method for a marking metal tube with identification indicia, comprising the steps of:
(a) rotatably moving at least one of a pair of spaced rotatable spools for moving a portion of a stencil extending between and interconnecting the spools and having identification indicia imprinted thereon into an etching station between a pair of aligned upper and lower electrodes;
(b) wetting a main portion of a wicking pad with a steady flow of electrolyte through capillary action in the wicking pad to the main portion, being disposed below the stencil portion and over and in contact with the lower electrode, from a lower end portion of the pad placed into a reservoir of electrolyte located below the main portion of the pad;

(c) placing a metal tube below the upper electrode and above the lower electrode, wicking pad main portion and stencil portion; and (d) moving the upper electrode toward the lower electrode with the metal tube placed under the upper electrode and above the stencil portion to press the metal tube downward into contact with the stencil portion and the stencil portion in turn into contact with the wicking pad main portion wetted with electrolyte and thereby facilitate etching of the identification indicia on the tube upon application of a predetermined voltage to the electrodes.

21. The method as recited in claim 20, further comprising the step of:

aligning the stencil portion imprinted with identification indicia at said etching station between said upper and lower electrodes.

22. The method as recited in claim 21, wherein said aligning includes matching a hole through the stencil portion adjacent to the identification indicia imprinted thereon with a hole through a base mounting the spools where the base hole is aligned with the electrodes.

23. The method as recited in claim 22, wherein said aligning further includes detecting when the stencil hole has been moved into alignment with the base hole.

* * * * *